United States Patent
Durrieu et al.

(10) Patent No.: US 6,426,321 B1
(45) Date of Patent: Jul. 30, 2002

(54) BIODEGRADABLE DRILLING MUD AND PROCESS FOR ITS PREPARATION

(75) Inventors: Josiane Durrieu, Pau; Anne Basseres, Bizanos; Michel Guillerme, Serres Castet; Christian Zurdo, La Haye Pays-Bas, all of (FR)

(73) Assignee: Elf Exploration Production, Courbevoie (FR)

( * ) Notice: Subject to any disclaimer, the term of this patent is extended or adjusted under 35 U.S.C. 154(b) by 0 days.

(21) Appl. No.: 09/531,178

(22) Filed: Mar. 21, 2000

(30) Foreign Application Priority Data

Mar. 22, 1999 (FR) .............................. 99 03527

(51) Int. Cl.$^7$ ................................. C09K 7/06
(52) U.S. Cl. .................... 507/131; 507/128; 507/138
(58) Field of Search ................ 507/128, 131, 507/138

(56) References Cited

U.S. PATENT DOCUMENTS

| | | | | |
|---|---|---|---|---|
| 2,216,865 A | * | 10/1940 | Wayne ........................ | 507/128 |
| 2,280,994 A | * | 4/1942 | Booth ......................... | 507/131 |
| 2,280,996 A | * | 4/1942 | Booth ......................... | 507/131 |
| 2,986,516 A | * | 5/1961 | Reddie ........................ | 507/128 |
| 3,650,951 A | * | 3/1972 | Marsh et al. ................ | 507/131 |
| 4,039,459 A | * | 8/1977 | Fischer et al. .............. | 507/131 |
| 4,459,214 A | * | 7/1984 | House et al. ................ | 507/128 |
| 5,002,672 A | * | 3/1991 | Hayes et al. ................ | 507/128 |
| 5,094,762 A | * | 3/1992 | Lahalih ....................... | 507/128 |
| 5,807,811 A | * | 9/1998 | Malchow, Jr. .............. | 507/128 |
| 5,945,385 A | * | 8/1999 | Naraghi ...................... | 507/128 |

\* cited by examiner

Primary Examiner—Philip Tucker
(74) Attorney, Agent, or Firm—Oblon, Spivak, McClelland, Maier & Neustadt, P.C.

(57) ABSTRACT

A biodegradable drilling mud, comprising a water/organic phase reverse emulsion in a volume ratio ranging from 50/50 to 10/90, which contains:

a) from 1 to 5% by volume of at least one nitrogen compound selected from the group consisting of amino acids, carbamic mono- and polyamides and mono- and polycarbamic amides, of formulae (I) and (II) respectively, taken alone or as a mixture:

$$R-[NH-CH_2]_n-CO-NH_2 \quad (I)$$

$$R-NH-[CO-NH]_m-H \quad (II)$$

wherein R is hydrogen or an alkyl group comprising from 1 to 10 carbon atoms and n and m are integers ranging from 1 to 5, b) from 2 to 10% by volume of at least one phosphorus derivative selected from the group consisting of surfactant phosphorus compounds, and c) from 2 to 10% by volume of at least one oxygenated compound selected from the group consisting of fatty acids, fatty acid esters of fatty alcohols comprising carbon-based chains comprising from 12 to 24 carbon atoms, alone or as a mixture, and plant or animal oils.

21 Claims, 2 Drawing Sheets

BIODEGRADABLE DRILLING MUD AND PROCESS FOR ITS PREPARATION

BACKGROUND OF THE INVENTION

1. Field of the Invention

The present invention is directed towards a biodegradable drilling mud and to a process for its preparation, irrespective of its use, on land or offshore. More particularly, the invention relates to drilling muds used on offshore platforms, the cuttings from which can be discharged at sea without treatment and which must, therefore, not present a major pollution hazard with respect to the marine environment.

2. Description of the Background

Drilling mud plays an essential role during drilling; it ensures maintenance of the fluids, gases, water and oils in the terrains passed through, the raising of the cuttings from the drilled terrain, the lubrication and cooling of the drilling tool, the maintenance of the cuttings in suspension and their raising to the surface. On leaving the well, it is necessary to separate the drilled cuttings from the mud before recirculating it in the well.

In parallel with this recirculation of the mud is the problem of storage of the mud-contaminated cuttings. Although this is difficult on a land platform, it is much more difficult to solve on an offshore platform, since the constraints regarding environmental regulation are much stricter. Thus, discharging the cuttings at sea is generally not authorized since, even after separation from the mud, these cuttings constitute a source of marine pollution and must be returned to land to be processed, which is very expensive for the operator.

Discharge of the cuttings at sea may depend essentially on the nature of the mud used, which is toxic or biodegradable to a greater or lesser extent.

Different types of muds are used for drilling. They are, firstly, water-based muds whose main organic fraction is based on cellulose, cellulose derivatives and acrylic acid derivatives. These muds are easily biodegradable and do not give rise to any potential degradation of the environment. Oil-based muds are preferable to the latter since they can be recovered and they give technically better performance. They have far superior lubricating power, which is most particularly favourable in the context of deviated wells. They withstand high temperature better, in particular a temperature above 150° C., and, lastly, they are inert with respect to reactive formations such as clay formations. They consist essentially of a stabilized reverse emulsion of water in oil, generally of gas oil or a mineral oil, and their physicochemical properties are adjusted by means of viscosifying additives, weighting additives and the like. However, they represent a very great risk of pollution since they are toxic and difficult to biodegrade. A new generation of oil-based muds, also known as replacement muds, is used as a replacement for muds based on gas oil, but they are still considered as being too polluting to authorize discharge of the cuttings at sea. These muds are formulated from polyglycols, polyethylene glycol or poly(α-olefins) as stabilized emulsions. Although these muds were developed to replace gas oil and mineral oils, rich in aromatic compounds in the formulation of oil-based muds, and although they have physicochemical properties similar to those of gas oil or mineral oils without being toxic, they are nevertheless slow to biodegrade or relatively poor at doing so.

In the current state of the legislations in force in certain countries, discharge offshore of. cuttings containing oil-based muds or replacement muds, with the exception of esters, is banned since these muds are not considered as biodegradable.

The biodegradability of the ester-based muds used hitherto also as replacement muds has also been demonstrated (see the publication by J. Steber, C. P. Herold (Henkel KGaA) and J. M. Limia (Baroid) Offshore, 60, September 1984). However, although the biodegradation processing proposed is effective, it is very long, which necessitates storage of the cuttings which is not easy to achieve on offshore platforms on which space is limited.

To accelerate the biodegradation of the muds, whether they are oil-based muds or ester-based replacement muds, it is possible to make them undergo enzymatic treatment prior to the bacteriological treatment which may be performed.

Enzymatic treatments of muds in general are known in particular to increase their permeability in the formation at the bottom of a well, as described in German patent DD 240,905 dated Sep. 13, 1985. Other treatments, as described in U.S. Pat. No. 5,126,051, use enzymatic hydrolysis reactions by means of cellulases or derivatives thereof, in order to degrade the residual viscosifying compounds from the mud.

In European Patent No. EP 0 712 809, to accelerate the biodegradation of the discharges and of the mud itself, the Applicant has recommended chemically modifying the ester-based muds in order to accelerate their bacteriological degradation by hydrolyzing the said mud using a lipase at basic pH, preferably ranging from 9 to 10, and at a temperature below 60° C.

Similarly, in International Application No. PCT/FR97/02354 filed Dec. 18, 1997, the Applicant has recommended chemically modifying replacement muds based on olefins or polyolefins by oxidizing them before discharge, by means of an oxidizing anion at acidic pH, preferably below 4, prior to the bacteriological treatment which may be performed.

SUMMARY OF THE INVENTION

Accordingly, one object of the present invention is to provide a biodegradable drilling mud whose composition whose physicochemical properties are comparable with those required for a drilling mud, and whose composition is readily biodegradable.

Briefly, this object and other objects of the present invention as hereinafter will become more readily apparent can be attained by a biodegradable drilling mud consisting of a water/organic phase reverse emulsion in a ratio by volume ranging from 50/50 and 10/90, comprising weighting additives, viscosifying additives, filtrate reducers, emulsifiers and any other additive intended to achieve the desired physicochemical properties, characterized in that it contains, for the purpose of biodegrading it, a) from 1 to 5% by volume, relative to the volume of the organic phase without additive, of a nitrogen compound from the group consisting of amino acids, carbamic mono- and polyamides and mono- and polyacarbamic amides, of formulae (I) and (II) below, respectively:

$$R-[NH-CH_2]n-CO-NH_2 \quad (I)$$

$$R-NH-[CO-NH]m-H \quad (II)$$

with R being hydrogen or an alkyl group comprising from 1 to 10 carbon atoms, n and m being integers ranging from 1 to 5, b) from 2 to 10% by volume, relative to the volume of the organic phase without additive, of at least one phosphorus compound from the group of surfactant phosphorus compounds, preferably an alkyl or alkenyl phosphoric ester comprising from 10 to 15 carbon atoms, c) and from 2 to 10%, relative to the volume of the organic phase without additive, of at least one carboxylic compound from the group consisting of fatty acids, fatty acid esters of fatty alcohols comprising carbon-based chains comprising from 12 to 24 carbon atoms, alone or as a mixture, and plant or animal oils.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
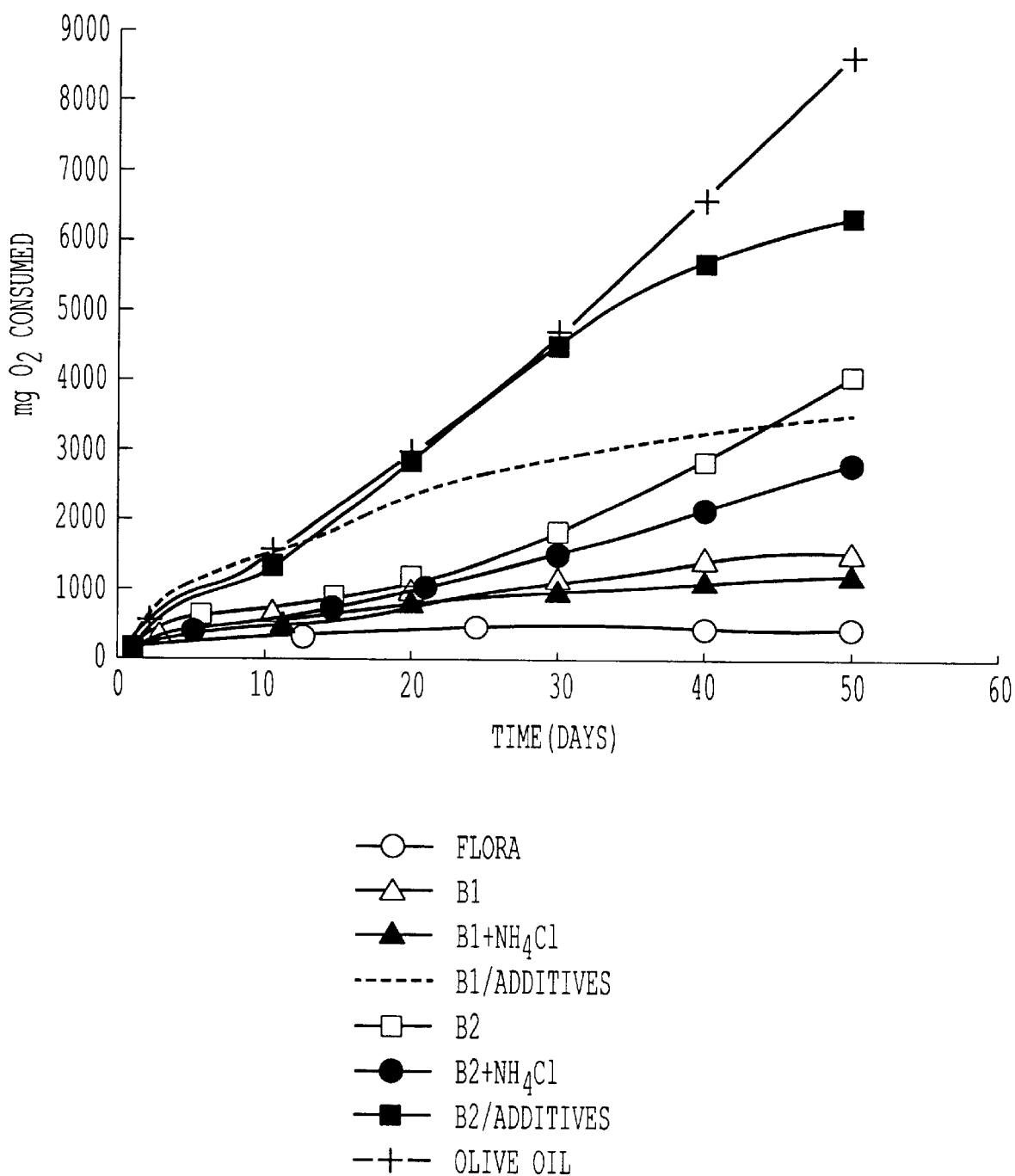
FIG. 1 is a kinetic monitoring curve of an embodiment of the drilling mud of the invention taken from the data of Table III.

The muds according to the invention have the advantage of being readily biodegraded, either in aerobic medium or in anaerobic medium, and irrespective of their composition, even in the absence of a pretreatment intended to facilitate their biodegradation. In addition, they are easy to prepare and do not require the addition of expensive biological compounds.

These muds according to the invention are composed of an organic phase comprising organic compounds from the group consisting of refined or unrefined petroleum derivatives, for instance gas oil, esters which are liquid between 0 and 5° C., based on monofunctional alcohols containing from 2 to 12 carbon atoms, and on saturated or unsaturated, mono- or polyolefinic aliphatic monocarboxylic acids containing from 12 to 24 atoms and linear, mono- or polyunsaturated olefins containing from 12 to 22 carbon atoms.

Among the nitrogen compounds added to the said mud in order to give it its biodegradable nature, the amino acids of formula (III) below may be selected:

in which $R_1$, is hydrogen or an alkyl group comprising from 1 to 4 carbon atoms and Z is a linear or branched hydrocarbon-based chain comprising from 1 to 5 carbon atoms or an aromatic or aliphatic ring containing 5 or 6 carbon, which is optionally substituted, the $NH_2$ and COOH functions possibly being on the same carbon atom or on two different atoms.

In one preferred embodiment, the nitrogen compound is chosen from carbamic mono- and polyamides and mono- and polyacarbamic amides of formulae (I) and (II), urea being preferred.

As an alternative or in combination with this said nitrogen compound, the amino acids are chosen from the group consisting of glycine, alanine, serine, cysteine, valine, glutamine, leucine, lysine, arginine,.proline, tyrosine, aspartic acid and glutamic acid.

In the mud according to the invention, the phosphorus compound is an alkyl or alkenyl phosphoric ester chosen from the group consisting of methylphosphoric ester, lauryl phosphate or a mixture of linear $C_{12}$ and $C_{14}$ phosphoric di- and triesters comprising from 3 to 4 ethoxylated groups. The preferred phosphorus compound is lauryl phosphate.

In a first embodiment of the invention, the oxygen compound is chosen from the group consisting of fatty acids comprising from 6 to 30 carbon atoms and preferably from 12 to 22 carbon atoms, and in particular oleic fatty acids of animal or plant origin oleic acid is preferred.

In a second embodiment of the invention, the oxygen compound in ester form is chosen from carboxylic acid monoesters and polyesters resulting from the esterification reaction of alcohols containing a linear or branched, saturated or unsaturated chain comprising from 1 to 15 carbon atoms, with a mono-, di- or polycarboxylic acid comprising linear or branched, saturated or unsaturated chains comprising from 6 to 30 carbon atoms. Preferably, these esters are mono-, di- and tricarboxylic acid esters, the ester groups comprising from 1 to 8 carbon atoms, and the chains of each acid comprising from 6 to 24 carbon atoms.

A subject of the present invention is also a process for preparing the said mud according to the invention, which consists in introducing these said phosphorus, nitrogen and oxygen compounds before or after placing the aqueous and organic phases in reverse emulsion, after which the weighting agent is added.

Having now generally described this invention, a further understanding can be obtained by reference to certain specific Examples which are provided herein for purposes of illustration only and are not intended to be limiting unless otherwise specified.

EXAMPLES

Example I

The present example is designed to describe the rheological properties and filtrate-reducing power of the muds according to the invention before and after ageing, showing that these muds are entirely adaptable to drilling, whether or not they comprise the biodegradation compounds according to the invention.

Three samples of mud $B_1$, $B_2$ and $B_3$ were prepared: their composition is described in Table I below, along with the composition of the additives added.

TABLE I

| Mud | B₁ | | B₂ | | B₃ | |
|---|---|---|---|---|---|---|
| Organic phase | Mineral oil | 650 ml (HDF2000) | Liquid paraffin | 447 ml (XP 07) | Olefinic oil | 463 ml (ISOTEQ) |
| Viscosifying agent | Carbovix 6Up | 15 g<br>2 ml | Geltone IV | 5 g | Carbogel 1<br>6Up | 17 g<br>3 g |
| Emulsifier | Carbotec<br>Carbomul | 13 ml<br>8 ml | EZ MUL 2f | 35 ml | Omnimul<br>Omnimix | 17 g<br>15 g |
| Filtrate-reducing agent | Carbotrol HT | 10 g | Duratone | 9 g | Carbotrol HT | 10 g |
| Water | | 221 ml | | 246 ml | | 263 ml |
| CaCl₂ (110%) | | 91 g | | 110 g | | 107 g |
| Lime | | 25 g | | 11 g | | 40 g |
| Baryta | | 245 g | | 633 g | | 204 g |
| Density (D₁) | | 1.14 | | 1.5 | | 1.16 |
| After addition of compounds according to the invention to accelerate the biodegradation | | | | | | |
| Organic phase | | 594 ml | | 402 ml | | 511.5 ml |
| Biodegradation additive | % volume | volume | % volume | volume | % volume | Volume |
| Oleic acid | 4.30% | 25.5 ml | 3.45% | 20.3 ml | 4.70% | 24 ml |
| Lauryl phosphate | 3.45% | 20.5 ml | 4.10% | 16.3 ml | 2.40% | 12.5 ml |
| Urea | 1.72% | 13.6 g | 2% | 10.8 g | 1.90% | 13 g |
| Density (D₂) | | 1.15 | | 1.51 | | 1.17 |

$D_1$ = density before treatment and $D_2$ = density after treatment.
% volume expressed relative to the volume of the organic phase.
The rheological properties of these muds, before and after treatment with biodegradation additives, are given in Table II below, before and after ageing at 80° C. for 16 hours.

TABLE II

| FANN 35 rpm | B1 | | B2 | | | | B3 | | | |
|---|---|---|---|---|---|---|---|---|---|---|
| Addition of | Aged | | Non-aged | | Aged | | Non-aged | | Aged | |
| nutrient | Before | After | Before | After | Before | After | Before | After | Before | After |
| 600 | 44 | 44 | 46 | 70 | 53 | 48 | 66 | 88 | 85 | 72 |
| 300 | 26 | 25 | 27 | 46 | 36 | 26 | 40 | 55 | 52 | 45 |
| 200 | 20 | 18 | 20 | 37 | 22 | 18 | 31 | 43 | 40 | 35 |
| 100 | 13 | 11 | 13 | 27 | 19 | 8 | 20 | 30 | 25 | 24 |
| 6 | 6 | 2 | 5 | 10 | 6 | 2 | 9 | 11 | 10 | 8 |
| 3 | 5 | 1 | 4 | 8 | 5 | 2 | 8 | 9 | 9 | 7 |
| Gel 0 | 6 | 2 | 7 | 9 | 7 | 2 | 12 | 10 | 15 | 9 |
| Gel 10 | 14 | 3 | 7 | 9 | 8 | 2 | 29 | 15 | 33 | 13 |
| VA (cP) | 22 | 22 | 23 | 35 | 26.5 | 24 | 33 | 44 | 42.5 | 36 |
| VP (cP) | 18 | 19 | 19 | 24 | 17 | 22 | 26 | 33 | 33 | 27 |
| YV | 8 | 6 | 8 | 22 | 19 | 4 | 14 | 22 | 19 | 18 |
| HP/HT filtrate 80° C./35 × 10⁵ Pa | 3 ml | 2.4 ml | 2.5 ml | 1.5 ml | 2.5 ml | 0.5 ml | 3 ml | 1 ml | 2 ml | 2.2 ml |
| SE | 400 V | 300 V | 475 V | 575 V | 375 V | 262 V | 600 V | 464 V | 620 V | 627 V |

It is observed that the behavior of the muds before and after addition of biodegradation additives according to the invention is comparable with that of the muds before treatment.

Example II

The object of these tests is to show that the presence of biodegradation additives according to the invention, as described in Example I (oleic acid, urea and lauryl phosphate), in drilling muds accelerates the biodegradation of these muds under aerobic conditions.

In order to check the biodegradability of the drilling muds under aerobic conditions, a so-called SAPROMAT experiment is carried out. This is a respirometric technique: continuous reactors under aerobic conditions are cultured in the presence or absence of drilling muds, for a period of one month, with a non-specific complex bacterial microflora from the marine environment. The amount of oxygen required for the bacterial degradation of the muds is measured and recorded throughout the incubation period. All the controls needed to interpret the results are tested.

In practice, the required amounts of treated and untreated muds are introduced into six 250 ml reactors containing 225 ml of seawater and are then inoculated with 25 ml of bacterial flora. Two other reactors of the same volume contain in the seawater, respectively, a control olive oil (positive control) and a control bacterial flora (estimation of the endogenous respiration).

The muds tested are those described in Table I of Example I, i.e. $B_1$, $B_2$ and $B_3$ non-aged, before and after addition of the biodegradation additives mentioned.

Since the muds are heterogeneous, they were ground using a Warring mill for 3 min at the maximum speed, and then two times 5 g of each of the three muds were taken with stirring and introduced into six reactors.

The content of each reactor is as follows:
Reactor 1 ($R_1$): bacterial flora (BF)
Reactor 2 ($R_2$): BF+$B_1$
Reactor 3 ($R_3$): BF+$B_1$/biodegradation additives
Reactor 4 ($R_4$) BF+$B_2$
Reactor 5 ($R_5$) BF+$B_2$/biodegradation additives Reactor 6 ($R_6$) BF+$B_3$
Reactor 7 ($R_7$) BF+$B_3$/biodegradation additives
Reactor 8 ($R_8$) BF+olive oil (1.54 g)

The comparative test lasted 60 days. The results of these tests are given in Table III below. They correspond to the amount of oxygen consumed in mg as a function of time in each of the reactors.

TABLE III

| Time (d) | $R_1$ | $R_2$ | $R_3$ | $R_4$ | $R_5$ | $R_6$ | $R_7$ | $R_8$ |
|---|---|---|---|---|---|---|---|---|
| 2 | 191 | 77 | 48 | 319 | 523 | 311 | 916 | 560 |
| 7 | 350 | 88 | 60 | 440 | 983 | 491 | 1462 | 1345 |
| 13 | 415 | 284 | 61 | 1116 | 1423 | 1158 | 2914 | 2096 |
| 20 | 439 | 417 | 63 | 2502 | 2161 | 2248 | 6699 | 3130 |
| 23 | 463 | 463 | 63 | 3231 | 2898 | 2558 | 7864 | 3685 |
| 27 | 485 | 490 | 64 | 3465 | 3109 | 2625 | 8216 | 3814 |
| 30 | 522 | 533 | 786 | 4039 | 4843 | 2757 | 8946 | 4256 |
| 34 | 544 | 562 | 1104 | 4667 | 7407 | 2887 | 9780 | 5053 |
| 37 | 558 | 578 | 1234 | 5088 | 8912 | 2994 | 10340 | 5636 |
| 42 | 586 | 606 | 1395 | 5908 | 10653 | 3246 | 11398 | 6754 |
| 48 | 614 | 626 | 1508 | 6628 | 11527 | 3532 | 12337 | 7945 |
| 51 | 628 | 633 | 1551 | 6949 | 11886 | 3665 | 12704 | 8541 |
| 56 | 653 | 644 | 1607 | 7439 | 12538 | 3855 | 13207 | 9547 |
| 62 | 683 | 658 | 1652 | 7899 | 13065 | 4020 | 13688 | 10598 |

(d) = days

If the oxygen consumptions with and without biodegradation additives are compared, it is possible to assess the degree of acceleration of the biodegradation of these various muds in the presence of the biodegradation additives of the invention (see Table IV below).

TABLE IV

| Muds containing biodegradation additives | Biodegradation acceleration rate | |
|---|---|---|
| | 30 days | 50 days |
| B1 | 1.5 | 2.5 |
| B2 | 1.2 | 1.7 |
| B3 | 3.2 | 3.4 |

It is seen from this Table that the biodegradation rate of each mud is increased considerably in the presence of biodegradation additives according to the invention.

From the kinetic monitoring curve established from the data in Table III (see FIG. 1), a commencement of biodegradation can already be seen from the second day of incubation, this biodegradation becoming significant at the end of the tests.

Example III

The object is to show that the introduction of organic nitrogen into each of the muds has an appreciable influence on the acceleration of the biodegradation kinetics of the muds.

An experiment as described in Example II above is carried out, again with eight reactors whose contents are given below.

Reactor 1 ($R_1$) bacterial flora (BF)
Reactor 2 ($R_2$) BF+$B_1$
Reactor 3 ($R_3$) BF+$B_1$/biodegradation additives
Reactor 4 ($R_4$) BF+$B_1$+inorganic N ($NH_4Cl$)
Reactor 5 ($R_5$) BF+$B_2$
Reactor 6 ($R_6$) BF+$B_2$+inorganic N ($NH_4Cl$)
Reactor 7 ($R_7$) BF+$B_2$/biodegradation additives
Reactor 8 ($R_8$) BF+olive oil (1.54 g)

The amount of inorganic nitrogen ($NT_4Cl$) is equivalent to the amount of organic nitrogen according to the invention (urea) introduced into each of the muds, Table V below gives the consumption in mg of oxygen for the various reactors over time.

TABLE V

| Time | $R_1$ | $R_2$ | $R_3$ | $R_4$ | $R_5$ | $R_6$ | $R_7$ | $R_8$ |
|---|---|---|---|---|---|---|---|---|
| 0 | 0 | 0 | 0 | 0 | 0 | 0 | 0 | 0 |
| 2 | 274 | 349 | 825 | 357 | 298 | 304 | 693 | 515 |
| 6 | 341 | 446 | 1342 | 461 | 373 | 384 | 1129 | 1121 |
| 10 | 388 | 527 | 1745 | 546 | 438 | 494 | 1502 | 1674 |
| 15 | 424 | 640 | 2091 | 654 | 631 | 779 | 2144 | 2380 |
| 21 | 447 | 774 | 2435 | 770 | 1000 | 1125 | 3072 | 3208 |
| 27 | 461 | 924 | 2743 | 881 | 1478 | 1482 | 4254 | 4203 |
| 34 | 468 | 1110 | 3061 | 997 | 2204 | 1878 | 5304 | 5536 |
| 41 | 476 | 1268 | 3361 | 1124 | 2999 | 2305 | 6014 | 6984 |
| 48 | 486 | 1409 | 3649 | 1266 | 3891 | 2786 | 6566 | 8271 |
| 152 | 1492 | 11483 | 3801 | 1343 | 4416 | 3074 | 6837 | 8866 |

If the oxygen consumption with and without biodegradation additives are compared, the rate of acceleration of the biodegradation of these various muds in the presence of the biodegradation additives of the invention can be assessed as in Example II. These rates of acceleration are given in Table VI below.

TABLE VI

| Mud treated | Rate 30 days | Rate 60 days |
|---|---|---|
| $B_1$/biodegradation additives | 2.97 | 2.56 |
| $B_1$ + $NH_4Cl$ | 0.95 | 0.91 |
| $B_2$/biodegradation additives | 2.88 | 1.55 |
| $B_2$ + $NH_4Cl$ | 1.00 | 0.70 |

Figure 2:
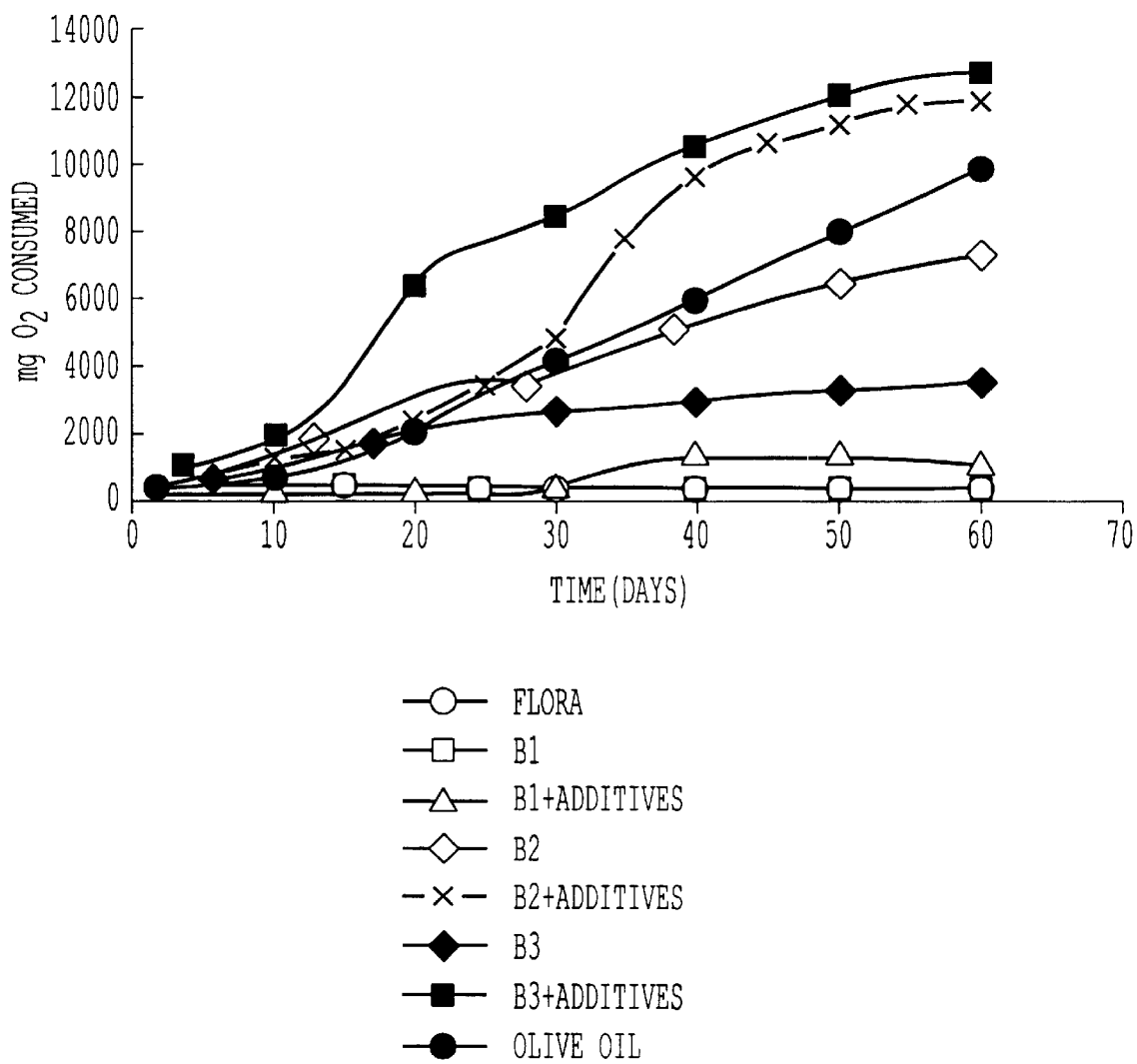
FIG. 2 represents the change in the mineralization kinetics of drilling mud embodiments in the presence of inorganic nitrogen and organic nitrogen.

FIG. 2 shows the change in the mineralization kinetics of these drilling muds in the presence of inorganic nitrogen or organic nitrogen.

These results show that the acceleration of the biodegradation of the muds is possible only in the presence of the source of organic nitrogen (urea) present in the biodegradation additives. No acceleration effect is detectable in the presence of inorganic nitrogen.

The disclosure of French priority Application No. 99-03527 filed Mar. 22, 1999 is hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed is:

1. A biodegradable drilling mud, comprising:
a water/organic phase reverse emulsion in a volume ratio ranging from 50/50 to 10/90, which contains:
a) from 1 to 5% by volume of at least one nitrogen compound selected from the group consisting of amino acids, carbamic mono- and polyamides and mono- and polycarbamic amides, of formulae (I) and (II) respectively, taken alone or as a mixture:

$$R\text{—}[NH\text{—}CH_2]_n\text{—}CO\text{—}NH_2 \qquad (I)$$

$$R\text{—}NH\text{—}[CO\text{—}NH]_m\text{—}H \qquad (II)$$

wherein R is hydrogen or an alkyl group comprising from 1 to 10 carbon atoms and n and m are integers ranging from 1 to 5, b) from 2 to 10% by volume of at least one phosphorus derivative selected from the group consisting of surfactant phosphorus compounds, and c) from 2 to 10% by volume of at least one oxygenated compound selected from the group consisting of fatty acids, fatty acid esters of fatty alcohols comprising carbon-based chains comprising from 12 to 24 carbon atoms, alone or as a mixture, and plant or animal oils, the percentages by volume being relative to the volume of the organic phase without additives, and comprising weighting additives, viscosifying additives, a filtrate reducer, emulsifiers and optionally alkaline agents, which contribute the desired physicochemical properties to the drilling mud.

2. The drilling mud according to claim 1, wherein the organic phase comprises organic components selected from the group consisting of (i) refined or unrefined petroleum fractions, and (ii) linear, mono- or polyunsaturated olefins containing from 12 to 22 carbon atoms.

3. The drilling mud according to claim 1, wherein the nitrogen compound is an amino acid of formula (III):

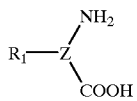

(III)

in which $R_1$ is hydrogen or a $C_{1-4}$-alkyl group and Z is a hydrocarbon-based chain comprising from 1 to 5 carbon atoms or an aromatic or aliphatic ring containing 5 or 6 carbon atoms, which is optionally substituted, the $NH_2$ and COOH functional groups being positioned on the same carbon atom or on two different carbon atoms.

4. The drilling mud according to claim 1, wherein said amino acid is selected from the group consisting of glycine, alanine, serine, cysteine, valine, glutamine, leucine, lysine, arginine, proline, tyrosine, aspartic acid and glutamic acid.

5. The drilling mud according to claim 1, wherein the nitrogen compound is selected from carbamic mono- and polyamides and mono- and polycarbamic amides of formulae (I) and (II).

6. The drilling mud according to claim 5, wherein the monocarbamic amide of formula (II) is urea.

7. The drilling mud according to claim 1, wherein the phosphorus derivative is alkyl or alkenyl phosphoric esters comprising from 10 to 15 carbon atoms.

8. The drilling mud according to claim 7, wherein the alkyl or alkenyl phosphoric esters are selected from the group consisting of methylphosphoric ester, lauryl phosphate or a mixture of linear $C_{12}$ and $C_{14}$ phosphoric di- and triesters comprising from 3 to 4 ethoxylated groups.

9. The drilling mud according to claim 8, wherein the phosphoric ester is lauryl phosphate.

10. The drilling mud according to claim 1, wherein the oxygen compound is a fatty acid comprising from 6 to 30 carbon atoms.

11. The drilling mud according to claim 10, wherein the oxygen compound is a fatty acid comprising from 12 to 22 carbon atoms.

12. The drilling mud according to claim 10, wherein the oxygen compound is an oleic fatty acid of animal or plant origin.

13. The drilling mud according to claim 10, wherein the oxygen compound is oleic acid.

14. A biodegradable drilling mud, comprising:
a water/organic phase reverse emulsion in a volume ratio ranging from 50/50 to 10/90, which contains:

a) from 1 to 5% by volume of at least one nitrogen compound selected from the group consisting of amino acids, carbamic mono- and polyamides and mono- and polycarbamic amides, of formulae (I) and (II) respectively, taken alone or as a mixture:

wherein R is hydrogen or an alkyl group comprising from 1 to 10 carbon atoms and n and m are integers ranging from 1 to 5, b) from 2 to 10% by volume of at least one phosphorus derivative selected from the group consisting of surfactant phosphorus compounds, and c) from 2 to 10% by volume of at least one oxygenated compound which is a fatty ester selected from the group consisting of carboxylic acid mono esters and polyesters which result from the esterification of alcohols containing a linear or branched, saturated or unsaturated chain comprising from 1 to 15 carbon atoms with a mono-, di- or polycarboxylic acid comprising linear or branched, saturated or unsaturated chains comprising from 6 to 30 carbon atoms.

15. The drilling mud according to claim 14, wherein the esters are mono-, di- and tricarboxylic acid esters, the ester groups comprising from 1 to 8 carbon atoms, and the chains of each acid comprising from 6 to 24 carbon atoms.

16. A process for preparing the drilling mud of claim 1, comprising:
preparing a mixture comprising from 1 to 5% by volume of the nitrogen compound, from 2 to 10% by volume of the phosphorus compound and from 2 to 10% by volume of the oxygen compound, before or after placing the aqueous and organic phases in a reverse emulsion in a ratio by volume ranging from 50/50 to 10/90, the percentages by volume being relative to the volume of the organic phase; and then
combining said mixture with said weighting agent.

17. The drilling mud according to claim 10, wherein the fatty acid is oleic fatty acid of animal or plant origin.

18. The drilling mud according to claim 2, wherein the refined petroleum fraction is mineral oil, gas oil or liquid paraffins.

19. The drilling mud according to claim 18, wherein the fatty acid is oleic acid.

20. A biodegradable drilling mud, comprising:
a water/organic phase reverse emulsion in a volume ratio ranging from 50/50 to 10/90, which contains:

a) from 1 to 5% by volume of at least one nitrogen compound selected from the group consisting of amino acids, carbamic mono- and polyamides and mono- and polycarbamic amides, of formulae (I) and (II) respectively, taken alone or as a mixture:

wherein R is hydrogen or an alkyl group comprising from 1 to 10 carbon atoms and n and m are integers ranging from 1 to 5, b) from 2 to 10% by volume of at least one phosphorus derivative selected from the group consisting of surfactant phosphorus compounds, and c) from 2 to 10% by volume of at least one oxygenated compound selected from the group consisting of fatty acids and plant or animal oils, the percentages by volume being relative to the volume of the organic phase without additives, to the drilling mud, and wherein the organic phase comprises organic compounds selected from the group consisting of (i) refined or unrefined petroleum fractions, (ii) esters which are liquid at a temperature ranging from 0 to 5° C. prepared by the reaction of monofunctional alcohols containing from 2 to 12 carbon atoms and saturated or unsaturated, mono- or polyolefinic aliphatic monocarboxylic acids containing from 12 to 24 atoms and (iii) linear, mono- or polyunsaturated olefins containing from 12 to 22 carbon atoms, the drilling mud further comprising weighting additives, viscosifying additives, a filtrate reducer, emulsifiers and optionally alkaline agents, which contribute the desired physicochemical properties to the drilling mud.

21. A biodegradable drilling mud, comprising:

a water/organic phase reverse emulsion in a volume ratio ranging from 50/50 to 10/90, which contains:

a) from 1 to 5% by volume of at least one nitrogen compound selected from the group consisting of amino acids, carbamic mono- and polyamides and mono- and polycarbamic amides, of formulae (I) and (II) respectively, taken alone or as a mixture:

$$R-[NH-CH_2]_n-CO-NH_2 \quad (I)$$

$$R-NH-[CO-NH]_m-H \quad (II)$$

wherein R is hydrogen or an alkyl group comprising from 1 to 10 carbon atoms and n and m are integers ranging from 1 to 5, b) from 2 to 10% by volume of at least one phosphorus derivative selected from the group consisting of surfactant phosphorus compounds, and c) from 2 to 10% by volume of at least one oxygenated compound selected from the group consisting of fatty acid esters of fatty alcohols comprising carbon-based chains comprising from 12 to 24 carbon atoms, alone or as a mixture, the percentages by volume being relative to the volume of the organic phase without additives, to the drilling mud, and wherein the organic phase comprises organic compounds selected from the group consisting of (i) refined or unrefined petroleum fractions, (ii) esters which are liquid at a temperature ranging from 0 to 5° C. prepared by the reaction of monofunctional alcohols containing from 2 to 12 carbon atoms and staturated or unsaturated, mono- or polyolefinic aliphatic monocarboxylic acids containing from 12 to 24 atoms and (iii) linear, mono- or polyunsaturated olefins containing from 12 to 22 carbon atoms with the proviso that the esters of (ii) are different from the fatty acid esters of fatty alcohols of (c), the drilling mud further comprising weighting additives, viscosifying additives, a filtrate reducer, emulsifiers and optionally alkaline agents, which contribute the desired physicochemical properties to the drilling mud.

* * * * *